(12) United States Patent
Corso et al.

(10) Patent No.: US 9,011,801 B2
(45) Date of Patent: Apr. 21, 2015

(54) FLUIDIC INTERFACE

(75) Inventors: Thomas N. Corso, Groton, NY (US); Colleen K. Van Pelt, Groton, NY (US)

(73) Assignee: Corsolutions LLC, Groton, NY (US)

( * ) Notice: Subject to any disclaimer, the term of this patent is extended or adjusted under 35 U.S.C. 154(b) by 0 days.

(21) Appl. No.: 13/490,261

(22) Filed: Jun. 6, 2012

(65) Prior Publication Data

US 2012/0305092 A1    Dec. 6, 2012

Related U.S. Application Data

(60) Provisional application No. 61/493,938, filed on Jun. 6, 2011, provisional application No. 61/541,600, filed on Sep. 30, 2011.

(51) Int. Cl.
| | | |
|---|---|---|
| *B01L 99/00* | (2010.01) | |
| *B23P 19/02* | (2006.01) | |
| *B01L 3/00* | (2006.01) | |
| *B01L 9/00* | (2006.01) | |

(52) U.S. Cl.
CPC ........... *B01L 3/502715* (2013.01); *B01L 3/563* (2013.01); *B01L 3/567* (2013.01); *B01L 9/50* (2013.01); *B01L 9/527* (2013.01); *B01L 2200/0689* (2013.01); *B01L 2200/10* (2013.01); *B01L 2400/06* (2013.01)

(58) Field of Classification Search
CPC ....... B01L 3/561; B01L 3/563; B01L 3/5623; B01L 3/027; B01L 3/50215
USPC ............... 422/544–546, 537–538; 137/15.01, 137/15.09, 15.11; 141/312, 319, 332, 346, 141/347, 368; 29/282
See application file for complete search history.

(56) References Cited

U.S. PATENT DOCUMENTS

| | | | |
|---|---|---|---|
| 4,619,473 A | | 10/1986 | Someya |
| 4,969,938 A | * | 11/1990 | America ......................... 96/105 |
| 5,467,806 A | * | 11/1995 | Stricklin et al. .............. 141/346 |
| 5,614,154 A | * | 3/1997 | Glatz et al. .................... 422/544 |
| 5,744,100 A | * | 4/1998 | Krstanovic .................... 422/537 |
| 6,193,286 B1 | | 2/2001 | Jones et al. |
| 6,273,478 B1 | | 8/2001 | Benett et al. |
| 6,319,476 B1 | | 11/2001 | Victor, Jr. et al. |
| 6,772,653 B1 | | 8/2004 | Franksson |
| 6,874,379 B2 | * | 4/2005 | Matsuda et al. ........... 73/864.14 |
| 6,926,313 B1 | | 8/2005 | Renzi |
| 7,028,536 B2 | | 4/2006 | Karp et al. |
| 7,033,543 B1 | * | 4/2006 | Panzer et al. ................. 422/525 |

(Continued)

FOREIGN PATENT DOCUMENTS

| | | |
|---|---|---|
| WO | 00/32308 | 6/2000 |
| WO | 2007/143547 | 12/2007 |

OTHER PUBLICATIONS

International Search Report for International Patent Application No. PCT/US2010/046661 (Mar. 31, 2011).

(Continued)

*Primary Examiner* — Brian R Gordon
(74) *Attorney, Agent, or Firm* — Joseph M. Noto; Bond, Schoeneck & King PLLC

(57) ABSTRACT

The invention provides for fluidic connections to be established between tubes, ports, fluidic components and fluidic devices. The leak-tight connections are formed through controlled, compressive forces and can be used for both low and high pressure applications.

14 Claims, 10 Drawing Sheets

(56) References Cited

U.S. PATENT DOCUMENTS

| | | | |
|---|---|---|---|
| 7,311,882 | B1 | 12/2007 | Renzi |
| 7,351,380 | B2 | 4/2008 | Simmons et al. |
| 7,553,455 | B1 | 6/2009 | Renzi et al. |
| 7,595,027 | B2* | 9/2009 | Itoh ........................ 422/523 |
| 7,641,859 | B2* | 1/2010 | Cote et al. ............... 422/522 |
| 7,735,878 | B2* | 6/2010 | Keene ...................... 285/332 |
| 7,766,033 | B2 | 8/2010 | Mathies et al. |
| 7,790,124 | B2 | 9/2010 | Matteo |
| 7,799,553 | B2 | 9/2010 | Mathies et al. |
| 8,163,254 | B1 | 4/2012 | Renzi et al. |
| 8,307,541 | B2* | 11/2012 | Ford et al. ................ 29/700 |
| 8,337,783 | B2* | 12/2012 | Locascio et al. ......... 422/546 |
| 8,569,070 | B2* | 10/2013 | Ellis et al. ................ 436/161 |
| 2006/0239863 | A1* | 10/2006 | Zach et al. ............... 422/100 |
| 2007/0003447 | A1 | 1/2007 | Gleason et al. |
| 2008/0131327 | A1 | 6/2008 | Van Dam et al. |
| 2009/0078322 | A1* | 3/2009 | Thomas et al. ........... 137/15.09 |
| 2010/0233038 | A1* | 9/2010 | Park et al. ................ 422/103 |
| 2012/0043757 | A1* | 2/2012 | Williams et al. ......... 285/339 |

OTHER PUBLICATIONS

Written Opinion of the International Searching Authority for International Patent Application No. PCT/US2010/046661 (Mar. 31, 2011).

PCT International Search Report; PCT/US2012/041139 mailed Mar. 13, 2013.

PCT Written Opinion of the International Searching Authority; PCT/US2012/041139 mailed Mar. 13, 2013.

* cited by examiner

FLUIDIC INTERFACE

CROSS-REFERENCE TO RELATED APPLICATIONS

This application claims priority from U.S. Provisional Patent Application Ser. Nos. 61/493,938, filed Jun. 6, 2011, and 61/541,600 filed Sep. 30, 2011, the contents of which are hereby incorporated by reference in their entirety.

FIELD OF THE INVENTION

This invention relates to a fluidic interface, in particular, the invention relates to a fluidic interface for creating a fluidic connection between a tube and a fluid receiving device.

BACKGROUND OF THE INVENTION

Advances in microfluidics technology and high performance liquid chromatography are revolutionizing molecular biology procedures for enzymatic analysis (e.g., glucose and lactate assays), DNA analysis (e.g., polymerase chain reaction and high-throughput sequencing), and proteomics. The basic idea of microfluidic biochips is to integrate assay operations such as detection, sample pre-treatment and sample preparation on a single microchip. An emerging application area for biochips is clinical pathology, especially the immediate point-of-care diagnosis of diseases. In addition, microfluidics-based devices, capable of continuous sampling and real-time testing of air/water samples for biochemical toxins and other dangerous pathogens, can serve as an always-on "bio-smoke alarm" for early warning. Low flow separation techniques, such as capillary electrophoresis, capillary electrochromatography, and low flow HPLC & UHPLC are further emerging applications.

A lab-on-a-chip (LOC) is a device that integrates one or several laboratory functions on a single chip from a few millimeters to a few square centimeters in size. LOCs deal with the handling of extremely small fluid volumes down to less than pico liters. Lab-on-a-chip devices are a subset of Microelectromechanical Systems (MEMS) devices and are often indicated by "Micro Total Analysis Systems" (μTAS) as well. Microfluidics is a broad term that includes mechanical flow control devices like pumps, valves and sensors such as flow meters and viscometers. "Lab-on-a-Chip" generally relates to the scaling of single or multiple lab processes down to chip-format, whereas "μTAS" is dedicated to the integration of the total sequence of lab processes to perform chemical analysis.

μTAS technologies are suitable for applications other than just analysis. For example, channels (capillary connections), mixers, valves, pumps and dosing devices are all suitable μTAS technologies.

The first LOC analysis system was a gas chromatograph, developed in 1975 by S. C. Terry—Stanford University. However, it was not until the end of the 1980's, and beginning of the 1990's, that LOC research started to seriously grow. The development of micropumps, flow sensors and the concepts for integrated fluid treatments for analysis systems was spurred by this research. These μTAS concepts demonstrated that integration of pre-treatment steps, usually done at lab-scale, could extend the simple sensor functionality towards a complete laboratory analysis, including additional cleaning and separation steps.

A big boost in research and commercial interest came in the mid 1990's, when μTAS technologies turned out to provide interesting tooling for genomics applications such as capillary electrophoresis and DNA microarrays. Another boost in research support came from the military, especially from DARPA (Defense Advanced Research Projects Agency), for their interest in portable bio/chemical warfare agent detection systems. The added value was not only limited to integration of lab processes for analysis but also the characteristic possibilities of individual components and the application to other, non-analysis, lab processes. Hence the term "Lab-on-a-Chip" was introduced.

Although the application of LOCs is still novel and modest, a growing interest of companies and applied research groups is observed in different fields such as analysis (e.g. chemical analysis, environmental monitoring, medical diagnostics and cellomics) but also in synthetic chemistry (e.g. rapid screening and microreactors for pharmaceutics). Further application developments, research in LOC systems is expected to extend towards downscaling of fluid handling structures as well, by using nanotechnology. Sub-micrometer and nano-sized channels, DNA labyrinths, single cell detection analysis and nano-sensors are feasible for interaction with biological species and large molecules.

Despite the immense amount of research around creating the chips themselves, interfacing to the real world, the "Chip-to-World" interface technology, has been limited. Progress to interface to the LOCs has progressed slowly. This invention serves as a way to make connections to microchips and similar-based microfluidic devices.

Lab-on-a-chip technology may be used to improve global health, particularly through the development of point-of-care testing devices. In countries with few healthcare resources, infectious diseases that would be treatable in developed nations are often deadly. In some cases, poor healthcare clinics have the drugs to treat a certain illness but lack the diagnostic tools to identify patients who should receive the drugs. LOC technology may be the key to provide powerful new diagnostic instruments. The goal of these researchers is to create microfluidic chips that will allow healthcare providers in poorly equipped clinics to perform diagnostic tests such as immunoassays and nucleic acid assays without additional laboratory support.

The basis for most LOC fabrication processes is photolithography. Initially most processes were in silicon, as these well-developed technologies were directly derived from semiconductor fabrication. Because of demands, for, e.g., specific optical characteristics, bio- or chemical compatibility, lower production costs and faster prototyping, new processes have been developed such as glass, ceramics and metal etching, deposition and bonding, PDMS processing (e.g., soft lithography), thick-film- and stereolithography as well as fast replication methods via electroplating, injection molding and embossing. Furthermore, the LOC field more and more exceeds the borders between lithography-based microsystem technology, nanotechnology and precision engineering.

LOCs may provide advantages, which are specific to their application. Typical advantages of LOC systems include:

low fluid volumes consumption (less waste, lower reagents costs and less required sample volumes for diagnostics);

faster analysis and response times due to short diffusion distances, fast heating, high surface to volume ratios, small heat capacities;

better process control because of a faster response of the system (e.g. thermal control for exothermic chemical reactions);

compactness of the systems due to integration of much functionality and small volumes;

massive parallelization due to compactness, which allows high-throughput analysis;

lower fabrication costs, allowing cost-effective disposable chips, fabricated in mass production; and safer platform for chemical, radioactive or biological studies because of integration of functionality, smaller fluid volumes and stored energies.

To interface microchips to their supporting hardware systems remains a significant challenge. And the lack of robust, reliable technology to make these connections has not only slowed microfluidic research, but is preventing chip-based solutions from being applied to real world applications. While extensive research effort has been directed toward microchip performance and fabrication, very little effort has been focused on technologies to interface these chips to fluidic and electronic hardware. The end result is that microchip performance is often compromised due to the underdeveloped interface technology.

Nano-liquid chromatography (nanoLC) is also a powerful technique that has significant challenges. NanoLC uses chromatography columns with inner diameters ranging from 25-150 μm packed with 2-5 μm stationary phase particles. However, the most typical column size is 75 μm inner diameter with <5 μm particles. Typical nanoLC flow rates range from 50-300 nL/min. Smaller particle sizes and longer columns generate higher resolving power, but also increased backpressure on the system. NanoLC is ideal for resolving highly complex, intractable biological mixtures. This is due to the fact that nanoLC only requires attomole to femtomole sample amounts and offers high sensitivity because of its resolving power. As a result, more complex problems may now be addressed such as molecular interactions, ion structures, quantitation, and kinetics in the both the field of proteomics and glycomics. Consequently, nanoLC is a necessity for biological laboratories. Other low flow separation techniques including capillary electrophoresis, capillary zone electrophoresis, and capillary electrochromatography offer high sensitivity, but are difficult to couple to mass spectrometry and have limited sample loading volumes.

The combined technique of nanoLC/electrospray/mass spectrometry, often abbreviated nanoLC/MS, has emerged as the gold standard for proteomic and glycomic laboratories. This combined technique can resolve highly complex mixtures with components covering a wide dynamic range, can then obtain valuable mass spectral data, and ultimately identify the components in the mixture. Furthermore the technique can identify, localize, and structurally characterize subtle chemical variations between sample components such as post-translational modifications. Quantitative proteomic profiling using LC/MS is an emerging technology with great potential for the functional analysis of biological systems and for the detection of clinical diagnostic marker proteins. This technology has been demonstrated for quantitation of proteins, as well as specifically for phosphoproteins and glycoproteins. In addition to protein identification, characterization of post-translational modifications, and quantitation of protein differential expression, nanoLC/MS has also been used to investigate protein-protein complexes. Thus, nanoLC/MS is a far-reaching technology, positively impacting many areas of proteomics, and consequently the technique is invaluable to biological laboratories. However, unfortunately nanoLC/MS is alarmingly underutilized due to the complexity, limited robustness, and high level of expertise required of nanoLC/ESI systems. These unfavorable attributes arise from several shortcomings of the technique.

Conventional nanoLC/ESI systems suffer from several limitations. The first drawback is that system reproducibly is highly dependent on user skill level. This is due to user inabilities handling, cutting, connecting, positioning, and inconsistently setting-up the column and spray emitter. The second limitation is the level of difficulty in making the required nanofluidic connections. The delicate nanoLC connections are dependent on individual human coordination skills. In addition, conventional fittings frequently fatigue, slip or loosen over time and require further tightening, but all too often fittings are over-tightened which leads to leakage. Also, hand-cutting of capillaries often leads to formation of fractures and jagged ends of the cleaved tubing, which can produce thousands of fused-silica particulates when connections are attempted. These particulates cause column and emitter clogging and plugging, as well as internal valve damage. For low-pressure, post-column connections, often press-tight connectors are used. These press-tight connectors are notorious for leaking, and for plugging capillaries as teflon, from the teflon tubing, is shaved from the interior connector walls when the capillary is inserted. A poor connection can also create dead volume, which reduces chromatographic resolution. Then to troubleshoot the system when there is poor performance or a malfunction is very difficult. For small fluidic leaks, visual assessment and diagnosis is often not possible. High user skill is needed to troubleshoot, and repairing the system frequently involves blind substitution of parts to diagnose the problematic components. Finally, the technique is very labor intensive, especially when the system is first started.

So called "zero-dead-volume" couplings attempt to minimize the amount of unswept area at the coupling. Unfortunately, "zero-dead-volume" fittings still allow the formation of voids and unswept volumes in the area where the tube and the sealing feature of the fitting meet. Further, zero-dead-volume fittings are difficult to manufacture and, in the case of a chromatograph, allow exposure of the material coating the tube that absorbs and retains components of the chromatographic sample flow. Therefore, it would be desirable to provide a fluidic coupling from a tube to a fluidic path. Additionally the sealing connection may be into a component other than a cylindrical bore, such as many microfluidic devices.

In summary, microfluidics and nano-liquid chromatography, are powerful techniques with tremendous challenges. The majority of these challenges reside in the making of leak-tight fluidic connections. The invention disclosed here provides a solution to facilitate the making of leak-tight fluidic connections for applications including microfluidics and liquid chromatography.

SUMMARY OF THE INVENTION

In accordance with one aspect of the present invention, there is provided a system for making a fluidic connection including:

a tube having a first end and a second end, wherein the second end is in fluid communication with a fluid source;

a compressible material having a first end and a second end and surrounding the tube near the first end of the tube;

a compression applicator capable of exerting a force on the first end of the compressible material;

a fluid receiving device having a fluid inlet capable of contact with the second end of the compressible material and the first end of the tube; and a receiving feature with a constraining function capable to bias the compressible material against at least the tube near the first end of the tube and the fluid inlet of the fluid receiving device when the compression applicator exerts a force on the first end of the compressible material thereby effecting a fluidic connection having a leak-resistant seal between the tube and the fluid receiving device.

In accordance with another aspect of the present invention, there is provided a method for making a fluidic connection including:

providing a fluidic system including a tube having a first end and a second end, wherein the second end is in fluid communication with a fluid source;

a compressible material having a first end and a second end and surrounding the tube near the first end of the tube;

a compression applicator capable of exerting a force on the first end of the compressible material;

a fluid receiving device having a fluid inlet capable of contact with the second end of the compressible material and the first end of the tube; and a receiving feature with a constraining function capable to bias the compressible material against at least the tube near the first end of the tube and the fluid inlet of the fluid receiving device when the compression applicator exerts a force on the first end of the compressible material;

placing the first end of the tube in contact with the fluid inlet of the fluid receiving device; and exerting a force on the first end of the compressible material with the moveable compression applicator so as to bias the compressible material against at least the tube near the first end and the fluid inlet of the fluid receiving device thereby effecting a fluidic connection having a leak-resistant seal between the first end of the tube and the fluid receiving device.

In accordance with another aspect of the present invention, there is provided a method for making a direct tube connection to a fluidic receiving device including:

a) providing a system including:

a tube having a first end and a second end, wherein the second end is in fluid communication with a fluid source;

a base comprising a compression applicator capable of exerting a force on the tube near the first end;

a microfluidic device having at least one fluid inlet and at least one fluid outlet, wherein said microfluidic device is in contact with the base;

at least one tube holder comprising a mechanism capable of securing the tube, wherein the holder is mounted on an end of the compression applicator;

b) securing the tube near the first end with the tube holder;

c) aligning the first end of the tube with the fluid inlet of the microfluidic device;

d) exerting a compressive force with the compression applicator on the first end of the tube to directly contact the first tube end with the fluid inlet of the microfluidic device thereby effecting a fluidic connection having a leak-resistant seal between the tube and the fluid receiving device.

In accordance with another aspect of the present invention, there is provided a method system for making a fluidic connection including:

a tube having a first end and a second end, wherein the second end is in fluid communication with a fluid source;

a compressible material having a first end and a second end and surrounding the tube near the first end of the tube;

a receiver port having a fluid inlet capable of contact with the second end of the compressible material and the first end of the tube;

a compression applicator capable of exerting a force on the first end of the compressible material; and a receiving feature with a constraining function capable to bias the compressible material against at least the tube near the first end of the tube and the fluid inlet of the receiver port when the compression applicator exerts a force on the first end of the compressible material thereby effecting a fluidic connection having a leak-resistant seal between the tube and the fluid receiver port.

In accordance with another aspect of the present invention, there is provided a system according to the above aspect, wherein the fluid inlet of the receiver port includes a mirror image of the tube, compressible material, compression applicator, and receiving feature with a constraining function.

These and other aspects of the present invention will become apparent upon a review of the following detailed description and the claims appended thereto.

DETAILED DESCRIPTION

Figure 1:
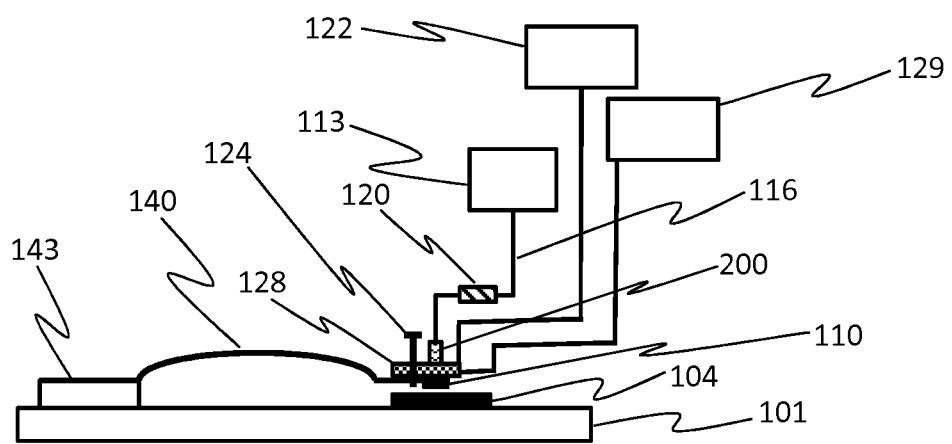
FIG. 1 shows an embodiment of an overall system where a sealing component on the end of a movable probe is used to make leak-tight, fluidic, compression connection between a fluid delivery tube and a fluid receiving device.

Referring to FIG. 1, there is shown the system for making fluidic connections according to one embodiment of the present invention. The fluidic connection system includes a base 101, a fluid receiving device 104 and at least one movable probe 140. The base 101 is fashioned to hold a fluid receiving device 104 such as a wafer, die or microchip. In one embodiment the movable probe 140 further contains a sealing component 110 to create a fluidic seal between a tube 116 and the fluid receiving device 104, such as a microfluidic device. The fluidic connection can include threads or can be a thread-less connection. Preferably, the connection is thread-less. The use of the term tube is meant to describe a hollow structure, such as a tube, pipe, capillary, syringe needle, or enclosed channel or conduit, and the like for transferring fluid, wherein the tube can have any cross-sectional geometry or shape, such as, but not limited to, square or cylindrical and be made of any of a wide variety of materials, such as, but not limited to metal, glass, fused-silica capillary, ceramic, polymer, and the like. Although one sealing component is shown on the movable probe, it is understood that multiple sealing components can be positioned on each movable probe without detracting from the invention. One probe may also manipulate a manifold containing a plurality of sealing components. To deliver fluid, a fluid delivery device or system 113, such as pump or pressure vessel is shown. In one embodiment, the fluid delivery device 113 is pneumatically pressurized to displace the liquid. In another embodiment a displacement pump is used to transfer the fluid. The fluid exiting the fluid delivery device 113 is delivered to the fluid receiving device 104 by a tube or delivery conduit 116. Sensors to measure fluid flow and/or fluid pressure 120 can be either built into the fluid delivery system 113, on the movable probe 140, or contained in the delivery conduit 116. In another embodiment various sensors 124, such as leak sensors, signal sensors, electrical sensors, or electrodes can be included in the fluidic connection system. In another embodiment a force sensor 128 can be employed to measure sealing compression. In another embodiment, a power supply 129 can be added to the system. In another embodiment, a component 122 that measures electrical signals can be added to the system. It is understood that any number of movable probes 140 can be positioned on the base at the same time. It is further understood that the movable probes 140 can be positioned to allow the sealing feature 110 to address the planar surface or the features on the edge of the microfluidic device.

Upon placement of a fluidic receiving device 104 on the system base 101, the movable probe 140 lowers to compress the sealing component 110 against ports in the fluidic receiving device 104. The probe may be positioned either manually or in an automated fashion. A probe, such as a movable arm can be locked in place prior to compression with a securing mechanism, such as clamp set screw or similar device. Optionally, a drive force mechanism applies a pre-determined sealing force. The drive force mechanism may also provide feedback and monitor the sealing force. This drive force can be applied by mechanisms known in the art, such as a fixed or adjustable spring selected to yield a specific force or compression, a pneumatic cylinder where a given amount of applied gas pressure provides a specific force, an electric motor which applies a certain amount of torque to provide a specific force, or alternatively, the drive force could be hydraulic. Other force generation mechanism may include magnetic attraction/repel or vacuum. In one embodiment the compression force is controlled by a motor assembly containing a lead screw, a bearing, and motor to allow travel of the movable probe. As the motor drives the lead screw, the movable probe is lowered, thereby compressing and sealing the sealing component to the stationary fluid receiving device. In another embodiment, the motor delivers a specific compression force. In another embodiment, a spring, lead screw, thumb screw, pneumatic assembly, or hydraulic assembly is used to generate the compressive force. Alternately, the force can be applied manually. Optionally, a load cell or force sensor is placed in-line to provide a continuous force read back during operation.

The leak free seal, as shown represented in FIG. 1, may be accomplished by sealing component 110. Suitable sealing components include known fittings, such as, but not limited to a gasket, O-ring, ferrule, frusto-concial, flange, knife edge, tapered structure, nipple, barb, and the like.

Referring to FIG. 1, the fluidic connection system includes a base 101, a fluid receiving device 104 and at least one force application structure 140 which is connected by mount 143 to the base 101. The base 101 is fashioned to hold a fluid receiving device 104, such as a wafer, die or microchip. In one embodiment the force application structure 140 is in contact with a sealing component 110, such that when force is applied by the force application structure 140 the sealing component 110 compresses against the fluid receiving device, forming a fluidic seal to the fluid receiving device 104. In this embodiment a fluid delivery device 113 delivers fluid via a delivery tube 116 to the fluid receiving device 104. The tube 116 is fixed to the force application structure 140 by a tube holder 200, such as a clamp. The force application structure could be automated or manual. Suitable force application structures include, but are not limited to a lever mechanism, loaded-spring, leaf spring mechanism, elastic material, magnetic, clamp, flexible beam, rigid beam, flexible coupler, rigid coupler, and the like.

Figure 2:
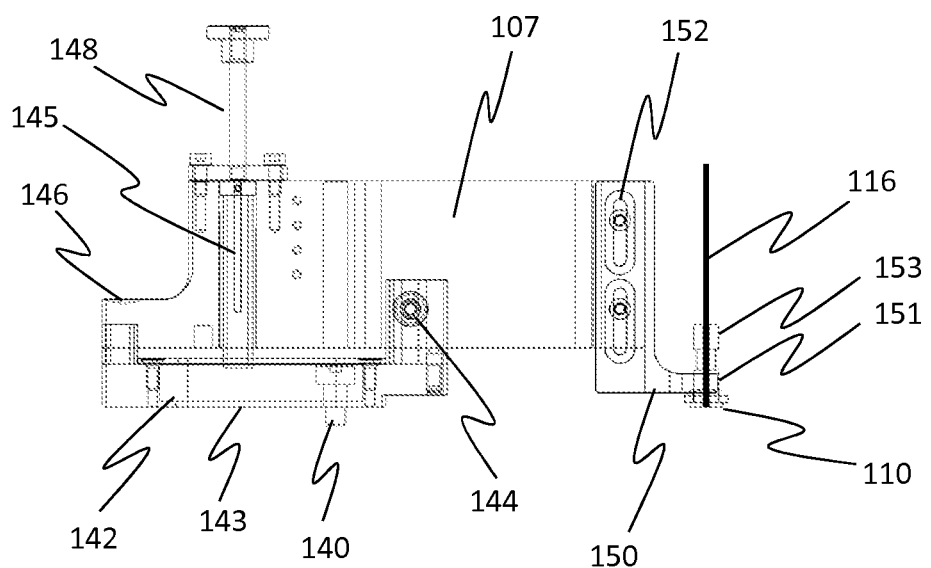
FIG. 2 shows an embodiment of a movable probe where the compressive sealing force can be controlled and the end attachment receiver can be changed to accommodate various types of sealing features.

Referring to FIG. 2 there is shown the system for making fluidic connections according to another embodiment of the present invention. Here one embodiment of a movable probe 107 is shown. The movable probe 107 has a mount component 140 allowing it to mount to a base (not shown). This may include a fastener, screw, magnet, adhesive, or any device to secure the probe to the base or component connected to the base. Other components such as translational stages, brackets guiding, swivels and other components may be used to position the arms in different locations or planes on the base. A pivot or slide mechanism 142 allows the moveable probe 107 to slide on the base. A fulcrum pivot point 144 and the force pre-load release 146 allow the compressive force to be on or off. For example when a user presses the force pre-load release 146, there is no compressive force between the sealing component 110 and the fluid receiving device (not shown). At this point a user can slide the movable probe 107 on the base to easily position the sealing component 110 at the desired point. Then when a user releases the force pre-load release 146, the movable probe 107 immediately compresses the sealing component 110 to the fluid receiving device 104. The applied force results in the sealing and additionally may apply downward force/pressure on the probe sliding surface 143 as to create a friction lock for between the probe and the base receiving plate it mounts to subsequently keeping the probe in a fixed location. The compressive force with which the movable probe 107 presses against the fluid receiving device can be controlled via a force generation mechanism 148, such as, but not limited to, a screw. In this embodiment the movable probe 107 is shown with an end attachment receiver 150 which allows the movable probe 107 to hold a variety of different sealing features 110. Although only one sealing component is shown on the movable probe, it is understood that multiple sealing components can be positioned on each movable probe without detracting from the invention. A scale or force indictor 145 may display the amount of applied force directly on the probe. This is an improvement over traditional threaded or adhered fittings as they have no direct indication of the applied force. In traditional threaded fittings there is no way of monitoring fatigue occurring on threads or the compressed material. The method of the invention described here allows for monitoring in real time and the ability to track the compression force over time. The sealing force may be a physical indictor or converted to an electronic signal for use with a display or logging system. The sealing information may be used as a diagnostic or as part of a monitoring system for automated connections where the parameters may be used for monitoring the sealing process and status. One probe may also manipulate a manifold containing a plurality of sealing components. In this embodiment the end attachment receiver 150 has a height adjustment feature 152. In additional to the arm being freely movable, the movable arm can be locked in place prior to compression with a securing mechanism, such as clamp, set screw, or similar immobilizing components. In another use, the probe may also be fixed in place in a pre-determined location and the devices are positioned relative to the arm.

Alignment of the sealing component to the desired location on the microdevice may be conducted by the user via the naked eye or enhanced by an optical system such as, a topside/backside optical or vision system, or visual marker. Other features such as a fiducial, datum, pre-determined mechanical stop, or visual stop may be used for the positioning of the arm or sealing component prior to the applied sealing force. The probe may be positioned to the device or the device may be positioned to the probe. The probe may also be moved a known distance to a sealing location.

The probes may also have the capability of holding or mounting other components such as holder, fixtures, optical sensors, optics, camera, electrodes, electronics, lighting, alignment cameras or optics positional guiding marks, tube routing, or the like. The base or receiving plate that the probe interfaces to may contain fixtures, optical sensors, optics, cameras, electrodes, electronics, lighting, alignment cameras or optics, positional guiding marks, tube routing components, or the like. The probe or receiver plate may also have features for securing a sealing lid for a microdevice.

In another embodiment, the force applicator as shown in FIG. 2 may be acted on by a threaded member 153 that inserts or threads into a receiver 151 on the axis with the bore of the tube. Receiver 151 and threaded member 153 may also be non-threaded where the force is generated elsewhere in the system. The compression force can be generated by the threaded member to act upon the sealing material. The arm may have female or male threaded features and the force applicator would accordingly have the corresponding thread type. Threading to the component then moves the force applicator towards the sealing device making the leak free compression seal. The arm or movable component that holds the threaded member is positioned so the tube seal material is aligned with the fluid receiving device inlet. The seal is then made by manual turning of the force applicator or a threaded component in contact with the force applicator as to compress the sealing material. Isolating the threaded member from the force applicator allows for a linear force to be applied to the seal material thus avoiding a twisting motion on the sealing material. In another embodiment, the probe holder may have a male threaded feature and the force applicator female threads. All threaded members may have a hole or access slot for allowing the tube to travel through. One threaded member may translate force to one or more sealing materials for making more than one leak tight compression seal. The opposing force for the sealing is translated from the threads to the holder or probe arm and subsequently the base or structure that the probe is connected to. This translating of force off axis differs from traditional threaded members or fittings where threaded members generate all forces on axis to the bore of the threaded members.

Figure 3:
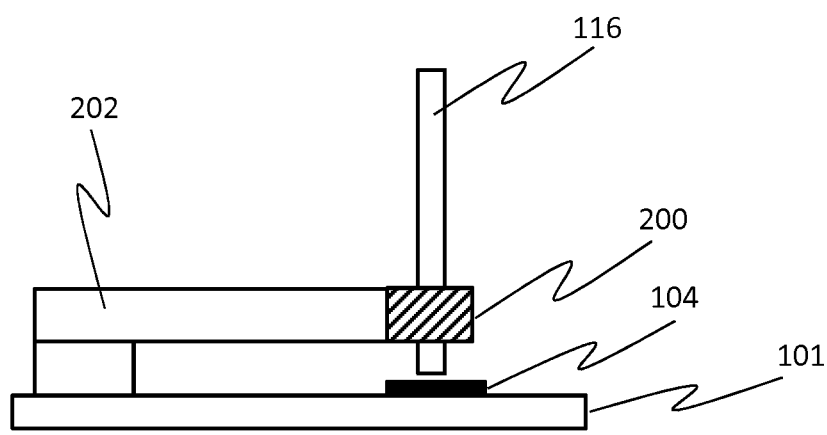
FIG. 3 shows an example of a system to compressively connect a tube, delivery conduit or needle, directly to a fluid receiving device.

Referring to FIG. 3 there is shown the system for making fluidic connections according to another embodiment of the present invention. In this embodiment a tube or delivery conduit 116 seals directly to a fluidic receiving device 104. The fluidic receiving device 104 rests on a base 101. A tube holder 200, such as a clamp, on the probe arm 202 can have a variety of geometries, and holds and aligns the delivery tube 116 to the desired port on the fluid receiving device 104. The compression force can be generated by loading of the spring mechanism, to create a direct tube-to-device fluidic seal. The tube-to-device sealing interface may be the native tube material or a modified tube end such for the purpose of controlling the compression property and material compatibility. The material or component may be coated, deposited, formed, molded, clamped, pinched, slip fit, adhered, replaceable, or the like on the tube's end for the aiding of a compression seal.

In another embodiment the tube 116 can be a hollow needle. In addition to tube, conduits, and other fluid path and containing structures, the probes may also hold and position piercing components such as hollow syringe needles for making fluidic connection and delivering liquid into soft substrates such as but not limited to polymers, plastics, PDMS, silicones, rubber, septa, and materials capable of being breached by a needle. Here the mechanical stability allows the needle to be positioned and held in place. In one embodiment the substrate seals around a syringe needle and no other components are needed for the seal where the compressible material is part of the device or the device is made in part from a compressible material. The probe may also hold and position solid needles or wires for applying electrical potentials via contact to reservoirs or piercing into a desire location where the compressible material is part of the device. In another embodiment, the holder may accept a component, such as a sleeve or intermediate structure attached to the tube.

The tube or conduit may be held by various ways of support and clamping, including for example, tube holder mechanisms shown above. Many other designs and approaches are possible. The tube positioning arm holds a structure/feature capable of holding a tube or conduit in position. The holder may be a permanent crimp or may be designed to temporarily hold the tube in place as so the tube may be adjusted or removed. The holder itself may also be adjustable or alternatively the holder may be manipulated by a positioning mechanism. The tube holder may be made from one or more parts and of various geometries suitable to hold the tube. The holder may have the ability to have movement for presenting the tube end parallel to the sealing surface. Alternatively, the component holding the clamp may allow for the clamp and subsequent tube to be manipulated as so the tube end is parallel or presented for the sealing of the tube's end. For tubes with angled ends, the sealing end would be adjusted to the corresponding angle for the leak tight seal. The clamp may have an associated feature of applying a controlled compressive force associated with it, such as a spring, motor, screw, cylinder, or the like.

Figure 4:
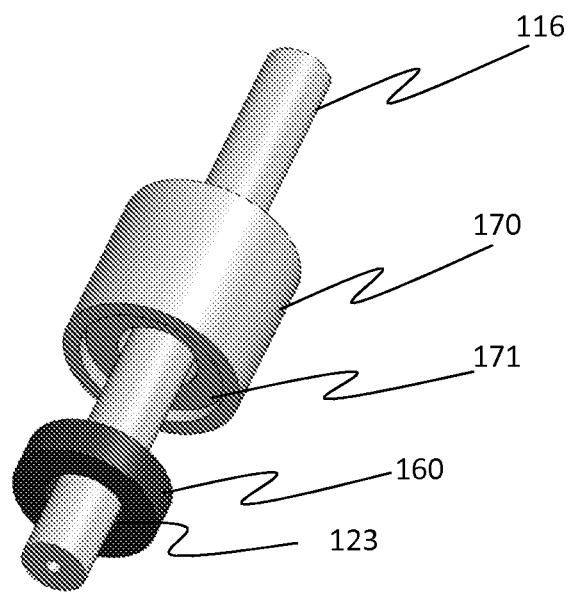
FIG. 4 shows an embodiment where a fluidic compression connection is made by compressing a compressible material between a receiving feature on a compression applicator and a fluidic receiving device, where the constraining feature is on the compression applicator.

Referring to FIG. 4 there is shown (exploded view) the system for making fluidic connections according to another embodiment of the present invention. Here a fluidic connection is made between a fluid receiving device 104 (not shown) and a tube 116 by applying force compressing a compressible material 160. The phrase compressible material is meant to describe a material that includes the properties of being elastic, flexible, and resilient, wherein, for example, the material is capable of substantially regaining its original shape after deformation. Suitable compressible materials include but are not limited to polymers, plastics, rubber, metals, and the like. The tube 116 is positioned over the port of a fluid receiving device 104 (not shown). Then a compression application component 170 which contains a receiving component with a constraining feature 171 pushes the compressible material 160. As the compressible material is pushed it is squeezed between the fluid receiving device 104 and the constraining feature 171 contained within the compression applicator 170, as well as around the tube, and a seal is formed. When the compression applicator 170 applies force, the compressible material fills the area in the constraining feature 171 and around the tube 116. The compressible material forms a leak tight seal 123 both (1) radially around the tube 116, and (2) between the fluid receiving device 104 and the tube 116. A constant force can be applied to maintain the connection. The compression of the sealable material may be controlled by a given amount of force, distance of movement by the component coming in contact with the sealing material, or the limiting component coming in contact with the sealing material such as a mechanical stop or sensor that relate back to the control of the applied force. The structure of compressible material 160 and constraining feature 171 are shown as cylindrical, however, they may be of any geometry. The constraining feature may also be integrated into the fluidic device or port. In another embodiment the device may serve as the sealing material provided the device has ample elasticity and resilience sufficient to exhibit sealing properties.

The seal 123 is made radially around the tube 116 as the material compresses inward, as well as with any other surfaces it contacts as the material expands in all non-constrained directions. This allows for sealing around the tube, the surface of the receiving port and its walls and other faces once the sealing material is compressed and fills the gaps. This embodiment allows for sealing into not only cylindrical ports, but also conical, linear-based structures, tapered walls, stepped walls, or any geometry to which the sealing material component conforms to. A resilient sealing material may be chosen for repeated sealing cycles.

Figure 5:
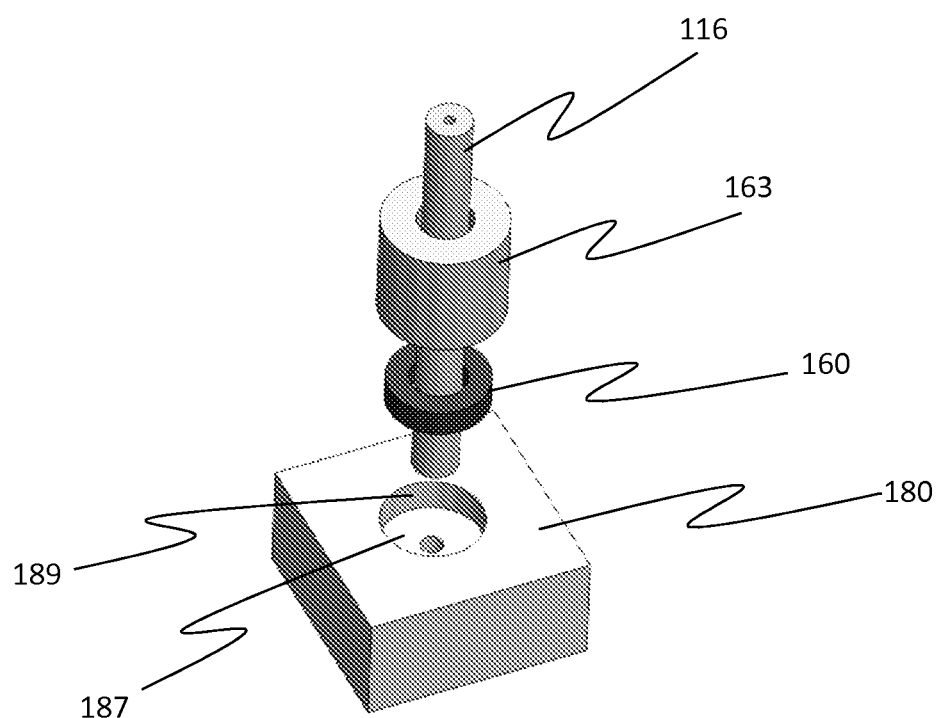
FIG. 5 shows an embodiment where a fluidic compression connection is made by compressing a compressible material between a compression applicator and a receiving feature with a constraining feature is on the fluidic receiving device.

Referring to FIG. 5 there is shown the system for making fluidic connections according to another embodiment of the present invention. Here a fluidic connection is made between a fluid receiving device 180 that contains a receiving feature 187 with a constraining function 189, and a tube 116 by compressing a compressible material 160. The tube 116 is positioned over the receiving feature 187 of the fluid receiving device 180 containing the constraining function 189. Then a compression applicator 163 pushes the compressible material 160. As the compressible material 160 is squeezed between the fluid receiving device 180 containing the receiving feature 187 with the constraining function 189, and the compression applicator 163, as well as around the tube 116, a seal is formed. When the compression applicator 163 applies force, the compressible material 160 fills the area in the receiving feature 187 of the fluid receiving device 180 and around the tube 116. The compressible material 160 forms a leak tight seal both (1) radially around the tube 116, and (2) between the fluid receiving device 180 and the tube 116. The constraining feature may be cylindrical or have any other geometric shape or sidewall profile, as the compressible material will conform to fill the open areas. This allows leak tight seals to be made on not only cylindrical structures but also other shapes commonly fabricated on microdevices, such as squared, or ports with tapered walls.

Figure 6:
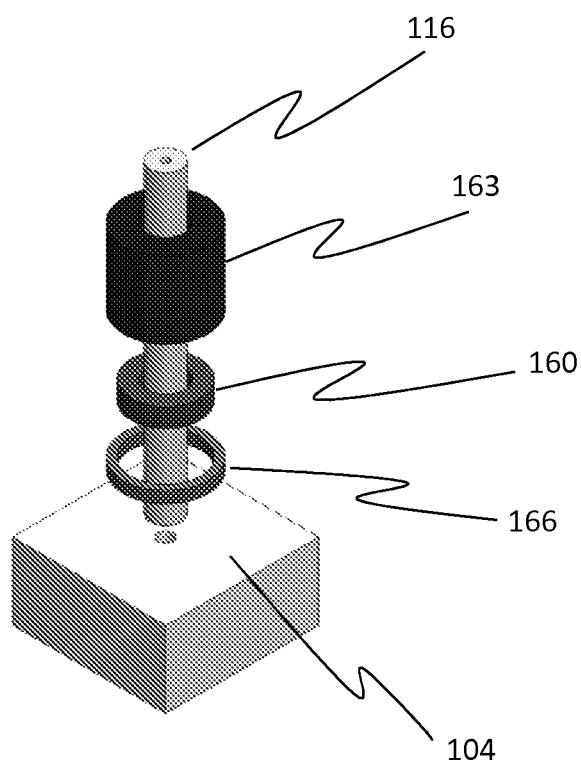
FIG. 6 shows an embodiment where a fluidic compression connection is made by compressing a compressible material between a fluidic receiving device and a compression applicator, where an independent constraining feature serves as a boundary for the compressive material when the compression force is applied.

Referring to FIG. 6 there is shown the system for making fluidic connections according to another embodiment of the present invention. Here a fluidic connection is made between a fluid receiving device 104 and a tube 116 by compressing a compressible material 160. Here a compression applicator 163 pushes the compressible material 160 into an independent receiving feature with a constraining function 166. The tube 116 is positioned over the port of the fluid receiving device 104, and the independent receiving feature with a constraining function 166 rests around the tube 116 on the surface of the fluid receiving device 104. When the compression applicator 163 applies force, the compressible material 160 fills the area in the receiving feature with constraining function 166. The compressible material 160 forms a leak tight seal both (1) radially around the tube 116, and (2) between the fluid receiving device 104 and the tube 116.

Figure 7:
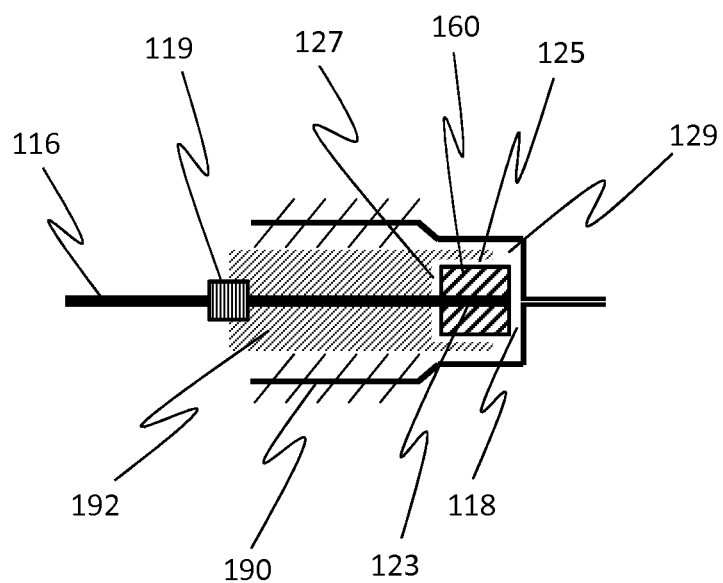
FIG. 7 shows an embodiment that uses a receiver fitting where a compression force applicator inserts into the receiver fitting and provides a boundary or constraining function for the compressible material, allowing for a leak-tight fluidic seal to be established.

Referring to FIG. 7 there is shown the system for making fluidic connections according to another embodiment of the present invention. Here a fluidic connection is made between a receiver port 190 (for example, a valve or union port) and a tube 116 by compressing a compressible material 160. The tube 116 is positioned over the exit of the receiver port 190 then a compression force applicator 192 pushes the compressible material 160. The compression force applicator 192 contains a receiving feature 127 with a constraining function 125. As the compressible material 160 is squeezed between the receiver port 190 and the compression force applicator 192 containing a receiving feature 127 with a constraining function 125, as well as around the tube 116, a fluidic seal is established. When the compression force applicator 192 applies force, the compressible material 160 fills the area between the receiver port 190 and the boundary provided by the compression force applicator 192, as well as around the delivery tube 116. This embodiment allows for (1) an outward radial seal around the compression force applicator 192 at the constraining function 125, (2) an inward radial seal 123 around the tube 116, and (3) a seal against the end 118 of the receiver port 190. Depending on the receiving structure geometry, the sealing material may expand into open area 129. This allows for sealing structures having geometries other than cylindrical structures. In this embodiment threaded features on the receiver fitting 197 are optional as the force may be applied by either a threaded means or by a non-threaded automation approach. The tube 116 may be positioned, fixed or held in place by a mechanical support 119. The tube 116 may be adjusted in the assembly procedure of the parts prior to use or allowed to float depending on the desired use. The choice of locking or self-adjusting depends on the desired application. For fixed tolerance the tube may be fixed in the correct position for tolerance reasons or for some connections the tube may be allowed to extend past the outlet of the compressible material where the tube will be pushed back by an opposing surface during the compression process until the compressible material compresses around the tube. This mechanical support allows for the tube be replaced as opposed to other approaches where tubes are permanently crimped in parts. Sealing may be applicable to common chromatography components such as pre-column, a transfer line, a trap, a filter, a frit, a reactor, a union, a tee, a manifold, a mixer, a vessel, a injector, an adapter, a sensor, a backpressure regulator, a coupler, a plug, a loop, a needle, a injector valve, a check valve, a metering valve, a splitting valve, a purge valve, a switching valve, and a Y-connecter.

Figure 8:
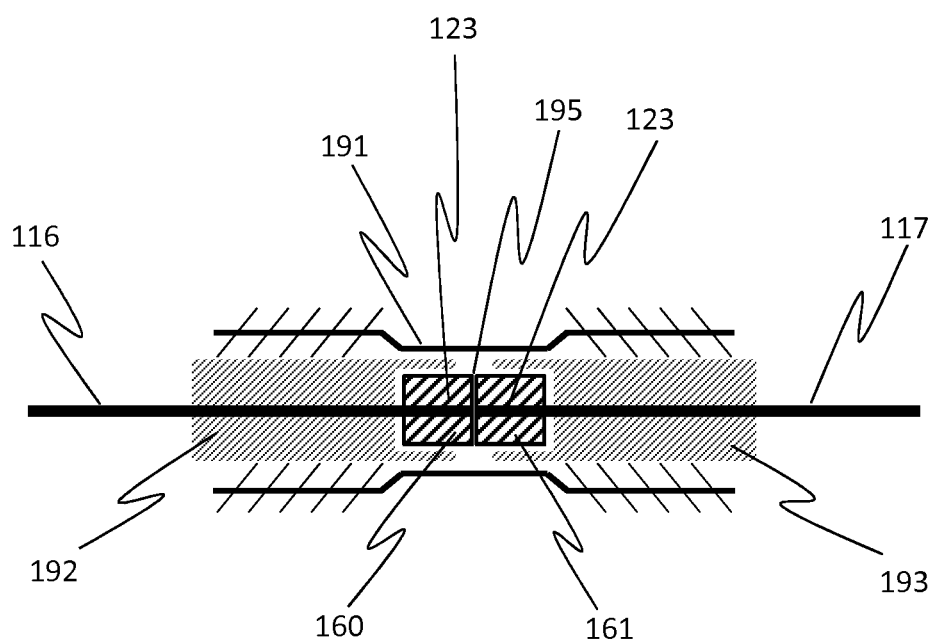
FIG. 8 shows an embodiment that connects two or more tubes or delivery conduits where compression force applicators with constraining features compress a compressible material sealing around a tube or delivery conduit and against a second compressible material sealing around a second tube or delivery conduit, wherein either two separate pieces of compressible material can be used, or alternatively one piece of material can be used.

Referring to FIG. 8 there is shown the system for making fluidic connections according to another embodiment of the present invention. Here a fluidic connection is made between a first tube 116 and a second tube 117. To make the connection, a compression force applicator 192 with a constraining feature compresses a compressible material 160. A second compression force applicator 193 with a constraining feature compresses a second compressible material 161. The result is compressible material 160 forms a radial seal 123 around tube 116, compressible material 161 forms a radial seal around tube 117, and a seal 195 is formed between the interface of compressible materials 160 and 161. In this embodiment threaded features on the receiver fitting 191 are optional as the force may be applied by either threads or by a non-threaded automation approach. In another embodiment seals to more than two tubes could be made. In another embodiment once piece of compressible material could be used, instead of two, where the compression force applicators apply force on two sides of the material. In another embodiment, one or more tubes 116 and 117 may be positioned, locked, fixed, or held in place by a mechanical support.

Figure 9:
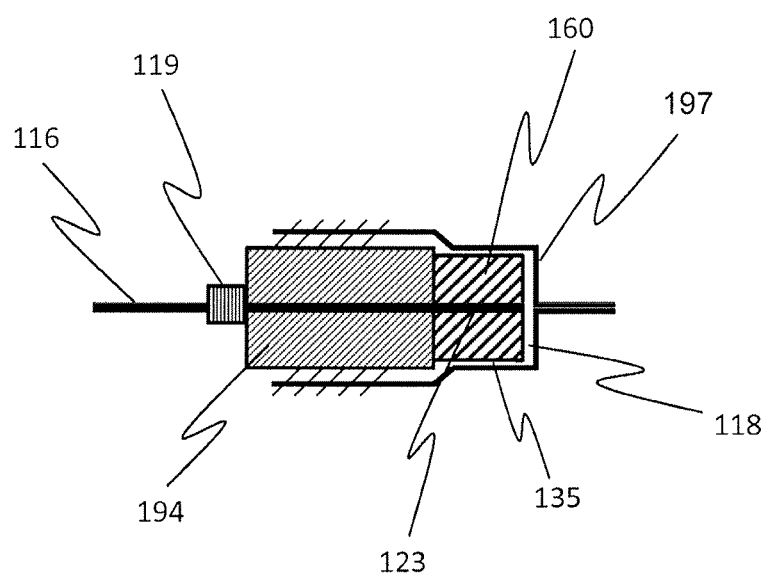
FIG. 9 shows another embodiment where the compression force applicator inserts into a receiver fitting and the receiver fitting itself provides a boundary or constraining function for the compressible material, allowing for a leak-tight fluidic seal to be established.

Referring to FIG. 9 there is shown the system for making fluidic connections according to another embodiment of the present invention. Here a fluidic connection is made between a receiver fitting 197 and a tube 116 by compressing a compressible material 160. The tube 116 is positioned over the exit of the receiver fitting 197 then a compression force applicator 194 pushes the compressible material 160. As the compressible material 160 is squeezed between the receiver fitting and the compression force applicator 194, as well as around the tube 116, a fluidic seal is established. Here the receiver fitting 197 provides the constraining function for which the compressible material 160 is to seal against. When the compression applicator 194 applies force, the compressible material 160 fills the area between the receiver fitting 197, as well as around the delivery conduit 116. This embodiment allows for (1) an outward radial seal 135 around fitting receiver 197, (2) an inward radial seal 123 around the tube 116, (3) a seal against the end of the compression force applicator and the compressible material, and (4) a seal 118 against the end of the receiver fitting 197 and the compressible material. In this embodiment threaded features on the receiver fitting 197 are optional as the force may be applied by either threads or by a non-threaded automation approach. The tube 116 may be positioned, locked or held in place by a mechanical support 119. The tube may be adjusted in the assembly procedure of the parts or allowed to float depending on the desired use. The choice of locking or self-adjusting depends on the desired application. For fixed tolerance the tube may locked in the correct position for manufacturing tolerance control or for some connections the tube may allow to extend past the outlet of the sealing component where it will be pushed back during by an opposing surface during the compression process until the seal component compresses around the tube. This mechanical support allows for the tube be replaced as opposed to other approaches where tubes are permanently crimped in the parts. Sealing may be applicable to common chromatography components such as pre-column, a transfer line, a trap, a filter, a frit, a reactor, a union, a tee, a manifold, a mixer, a vessel, a injector, an adapter, a sensor, a backpressure regulator, a coupler, a plug, a loop, a needle, a injector valve, a check valve, a metering valve, a splitting valve, a purge valve, a switching valve, and a Y-connecter.

Figure 10:
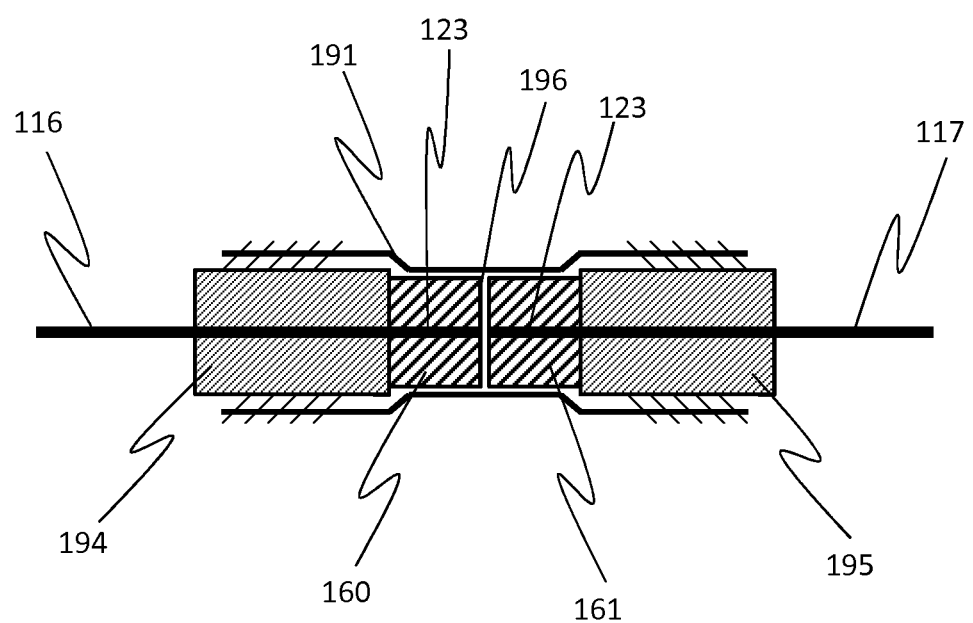
FIG. 10 shows an embodiment that connects two or more tubes or delivery conduits where the compression force applicators compress a compressible material sealing around a tube or delivery conduit and against a second compressible material sealing around a second tube or delivery conduit inside a receiver fitting, which serves as a constraining feature, wherein either two separate pieces of compressible material can be used, or alternatively one piece of material can be used.

Referring to FIG. 10 there is shown the system for making fluidic connections according to another embodiment of the present invention. Here a fluidic connection is made between a first tube 116 and a second tube 117. To make the connection, a compression force applicator 194 compresses a compressible material 160. A second compression force applicator 195 compresses a second compressible material 161. The receiver fitting 191 serves as a constraining feature. The result is compressible material 160 forms a radial seal 123 around tube 116, compressible material 161 forms a radial seal 123 around delivery conduit 117, and compressible materials 160 and 161 form a seal 196 between each other. In this embodiment threaded features on the receiver fitting 191 are optional as the force may be applied by either a threads or by a non-threaded automation approach. In another embodiment seals to more than two tubes could be made. In another embodiment once piece of compressible material could be used, instead of two, where the compression force applicators apply force on two sides of the material. In another embodiment, one or more tubes 116 and 117 may be positioned, locked, or held in place by a mechanical support.

Embodiments could include the constraining feature incorporated into the compression applicator, the constraining feature incorporated into the fluidic receiving device, the constraining feature incorporated into the receiver fitting or tube associated components, the constraining feature being a separate entity, or any combination thereof. Any geometry of the compressible material, including square, cylinder, disk, cone, sphere, taper, can be used, and any geometry of the compression applicator or the port of the fluidic receiving device, and receiver fitting can be used. The sealing material depends on the application and desired holding pressures. The embodiments listed here are applicable for low and high leak tight connection ranging up to 100,000 PSI.

While the invention has been described with preferred embodiments, it is to be understood that variations and modifications are to be considered within the purview and scope of the claims appended hereto.

What is claimed:

1. A system for making a fluidic connection comprising:
a tube having a first end and a second end, wherein the second end is capable of fluid communication with a fluid source;
a compressible material having a first end and a second end, wherein the second end of the compressible material is adjacent the first end of the tube;
a moveable compression applicator capable of exerting a force on the first end of the compressible material;
a fluid receiving device comprising a planar surface surrounding a fluid inlet, wherein the planar surface is capable of contact with the second end of the compressible material and the first end of the tube, such that the tube is in fluid communication with the fluid inlet; and
a receiving feature with a constraining function capable of biasing the compressible material against at least the tube adjacent the first end of the tube and the planar surface surrounding the fluid inlet of the fluid receiving device when the compression applicator exerts a force on the first end of the compressible material thereby making a direct, tube-to-receiving device fluidic connection having a leak-resistant seal between the tube and the planar surface of the fluid receiving device.

2. The system of claim 1, wherein the receiving feature with a constraining function is formed as part of the compression applicator.

3. The system of claim 1, wherein the receiving feature with a constraining function is formed as part of the fluid receiving device.

4. The system of claim 1, wherein the receiving feature with a constraining function is a separate component which is independent from the compression applicator and the fluid receiving device.

5. The system of claim 1, wherein the tube comprises a hollow needle.

6. The system of claim 1, wherein the fluid receiving device is a microfluidic device and the tube is a microfluidic tube.

7. The system of claim 1, wherein the direct tube-to-receiving device fluidic connection is a thread-less connection.

8. The system of claim 1, wherein the fluid receiving device is a chromatography device.

9. The system of claim 1, wherein the fluid inlet comprises a cylindrical, conical, linear, tapered, stepped, or combination thereof geometry.

10. A method for making a fluidic connection comprising:
   providing the fluidic system of claim 1;
   placing the first end of the tube in contact with the planar surface surrounding the fluid inlet of the fluid receiving device; and
   exerting a force on the first end of the compressible material with the moveable compression applicator so as to bias the compressible material against at least the tube adjacent the first end of the tube and the planar surface surrounding the fluid inlet of the fluid receiving device thereby making a direct, tube-to-receiving device fluidic connection having a leak-resistant seal between the first end of the tube and the planar surface of the fluid receiving device.

11. The system of claim 1, wherein the tube comprises a square or cylindrical cross-sectional shape.

12. The system of claim 1, wherein the fluid receiving device comprises a wafer, die, or microchip.

13. The system of claim 1, wherein the fluid receiving device comprises a device that integrates one or several laboratory functions.

14. The system of claim 13, wherein the laboratory functions comprise chemical analysis, environmental monitoring, medical diagnostics, cellomics, screening, microreactions, DNA labyrinths, single cell detection analysis, or sensing.

* * * * *